United States Patent
Curcio et al.

(10) Patent No.: US 11,172,208 B2
(45) Date of Patent: Nov. 9, 2021

(54) METHOD AND APPARATUS FOR IMPROVING THE VISUAL QUALITY OF VIEWPORT-BASED OMNIDIRECTIONAL VIDEO STREAMING

(71) Applicant: Nokia Technologies Oy, Espoo (FI)

(72) Inventors: Igor Danilo Diego Curcio, Tampere (FI); Miska Matias Hannuksela, Tampere (FI); Justin Ridge, Wylie, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 175 days.

(21) Appl. No.: 15/444,891

(22) Filed: Feb. 28, 2017

(65) Prior Publication Data
US 2018/0249163 A1    Aug. 30, 2018

(51) Int. Cl.
*H04N 19/167* (2014.01)
*H04N 19/119* (2014.01)
(Continued)

(52) U.S. Cl.
CPC ......... *H04N 19/167* (2014.11); *H04N 13/332* (2018.05); *H04N 13/366* (2018.05);
(Continued)

(58) Field of Classification Search
CPC .. H04N 19/167; H04N 13/332; H04N 13/366; H04N 19/119; H04N 19/33; H04N 19/176; H04N 19/137
(Continued)

(56) References Cited

U.S. PATENT DOCUMENTS 6,466,254 B1 * 10/2002 Furlan ............ H04N 21/234345
                                                      348/36
9,918,136 B2 *  3/2018 Cole ................... H04N 13/161
(Continued)

FOREIGN PATENT DOCUMENTS

CN    1297178 A    5/2001
CN    101399858 A   4/2009
(Continued)

OTHER PUBLICATIONS

International Search Report and Written Opinion for International Application No. PCT/FI2018/050122 dated Feb. 20, 2018.
(Continued)

*Primary Examiner* — Susan E. Hodges
(74) *Attorney, Agent, or Firm* — Alston & Bird LLP

(57) ABSTRACT

A method, apparatus and computer program products are provided for capturing omnidirectional video with one or more cameras, streaming the video over a network, and rendering the video on a Head Mounted Display (HMD) and more specifically to a method, apparatus, and computer program product for improving the visual quality of viewport-based omnidirectional video streaming. One example method includes selecting a primary viewport, encoding a first representation that covers the primary viewport, and encoding a second representation that provides a gradual picture quality change from a background viewport to the primary viewport.

30 Claims, 13 Drawing Sheets

(51) Int. Cl.
*H04N 19/137* (2014.01)
*H04N 19/176* (2014.01)
*H04N 19/33* (2014.01)
*H04N 13/332* (2018.01)
*H04N 13/366* (2018.01)

(52) U.S. Cl.
CPC ......... *H04N 19/119* (2014.11); *H04N 19/137* (2014.11); *H04N 19/176* (2014.11); *H04N 19/33* (2014.11)

(58) Field of Classification Search
USPC .......................................................... 375/240
See application file for complete search history.

(56) References Cited

U.S. PATENT DOCUMENTS

| | | | | |
|---|---|---|---|---|
| 10,096,130 | B2* | 10/2018 | Pio | G06T 7/60 |
| 10,645,362 | B2* | 5/2020 | Abbas | H04N 13/194 |
| 2006/0093033 | A1* | 5/2006 | Kim | G06T 9/005 |
| | | | | 375/240.03 |
| 2017/0236252 | A1* | 8/2017 | Nguyen | H04N 13/383 |
| | | | | 345/419 |
| 2017/0251204 | A1* | 8/2017 | Gupte | H04N 13/178 |
| 2017/0251208 | A1* | 8/2017 | Adsumilli | H04N 19/597 |
| 2017/0280126 | A1* | 9/2017 | Van der Auwera | G06T 3/0062 |
| 2017/0347163 | A1* | 11/2017 | Wang | G06T 9/00 |

FOREIGN PATENT DOCUMENTS

| | | |
|---|---|---|
| EP | 1 162 830 A2 | 12/2001 |
| EP | 2490179 | 8/2012 |
| WO | WO 2010/021449 A1 | 2/2010 |

OTHER PUBLICATIONS

Gaddam, VR et al., "Tiling in Interactive Panoramic Video: Approaches and Evaluation." IEEE Transactions on Multimedia. IEEE [online], Jun. 29, 2016, vol. 18, No. 9, 1819-1831, [retrieved on Jun. 12, 2018].

Kammachi et al., "Viewport-adaptive Encoding and Streaming of 360-degree Video for Virtual Reality Applications" IEEE International Symposium on Multimedia, (2016).

Wang et al., "Tile Based VR Video Encoding and Decoding Schemes" (JCT-VC) of ITU-T SG 16 WP 3 and ISO/IEC JTC 1/SC 29/WG 11, 24th Meeting Geneva, CH, (May 26-Jun. 1, 2016).

Extended European Search Report for Application No. 18761570.3 dated Jul. 14, 2020, 11 pages.

Office Action for European Application No. 18761570.3 dated Jun. 9, 2021, 8 pages.

* cited by examiner

200

| Tile_B/ quality 3 | Tile_C Qual: 3→2 | Tile_A/ quality 2 |

FIG. 6C

Configuration A:

| Tile_B / Low quality | Tile_C Qual: L→H | Tile_A/ High quality |

Configuration B:

| Tile_B/ High quality | Tile_D Qual: H→L | Tile_A / Low quality |

FIG. 8C

METHOD AND APPARATUS FOR IMPROVING THE VISUAL QUALITY OF VIEWPORT-BASED OMNIDIRECTIONAL VIDEO STREAMING

TECHNOLOGICAL FIELD

Embodiments of the present invention relate generally to capturing omnidirectional video with one or more cameras, streaming the video over a network, and rendering the video on a Head Mounted Display (HMD) and more specifically to a method, apparatus, and computer program product for improving the visual quality of viewport-based omnidirectional video streaming.

BACKGROUND

To save storage capacity and streaming bandwidth, conventional processes for streaming omnidirectional video typically involve encoding the tile(s) associated with a primary viewport at higher quality (e.g., at higher spatial resolution and/or with a lower quantization parameter value) thereby offering a higher visual quality, whereas other tiles associated with non-primary viewports (e.g., those not currently being watched by the user, or falling in his/her viewing periphery) are encoded at lower qualities (e.g., at lower spatial resolutions and/or using a higher quantization parameter value).

Due to this process, adjacent tiles may therefore have different objective and subjective qualities. The main issue with this scheme is that, when rendering several adjacent tiles with different qualities, boundaries between tiles may appear visible, causing a decrease of the overall subjective quality of experience. That is, a boundary between tiles having different resolution and/or quality may be visible in the case when the user changes the viewing orientation, for example, when viewing the content with a HMD and turning one's head, there may be a period of time before the high-resolution/high-quality content fully covering the new primary viewport is available for displaying. Users may find the spatially varying resolution and/or quality annoying when the boundary of different resolutions and qualities is sharp and/or clearly perceivable.

BRIEF SUMMARY

Embodiments described herein seek to improve the visual quality of viewport-based omnidirectional video streaming, and in particular, embodiments disclosed herein are directed to concealing the sharp resolution and/or quality boundary between viewports.

In some embodiments, a method may be provided comprising selecting a primary viewport, encoding a first representation that covers the primary viewport, and encoding a second representation that provides a gradual picture quality change from a background viewport to the primary viewport.

In some embodiments, the method may further comprise selecting a tile grid in a manner that the first representation and the second representation are non-overlapping and adjacent. In some embodiments, the method may further comprise encoding the first representation as a first motion-constrained tile set and the second representation as a second motion-constrained tile set. In some embodiments, the method may further comprise encoding a third representation, the third representation being non-overlapping with and adjacent to the second representation and non-adjacent to the first representation, the background viewport covering the third representation, selecting the tile grid in a manner that the second representation occupies a fraction of coding blocks compared to the first representation and the third representation.

In some embodiments, the method may further comprise encoding a fourth representation, the fourth representation being non-overlapping with and adjacent to the first representation, the background viewport covering the fourth representation, encoding the second representation as a region-of-interest scalable layer over one or both of the first representation and the fourth representation. In some embodiments, the second representation covers a fraction of coding blocks compared to the first representation and the fourth representation.

In some embodiments, an apparatus may be provided, the apparatus comprising at least one processor and at least one memory including computer program code, the at least one memory and the computer program code configured to, with the processor, cause the apparatus to at least select a primary viewport, encode a first representation that covers the primary viewport, and encode a second representation that provides a gradual picture quality change from a background viewport to the primary viewport.

In some embodiments, the at least one memory and the computer program code are further configured to, with the processor, cause the apparatus to select a tile grid in a manner that the first representation and the second representation are non-overlapping and adjacent. In some embodiments, the at least one memory and the computer program code are further configured to, with the processor, cause the apparatus to encode the first representation as a first motion-constrained tile set and the second representation as a second motion-constrained tile set.

In some embodiments, the at least one memory and the computer program code are further configured to, with the processor, cause the apparatus to encode a third representation, the third representation being non-overlapping with and adjacent to the second representation and non-adjacent to the first representation, the background viewport covering the third representation, select the tile grid in a manner that the second representation occupies a fraction of coding blocks compared to the first representation and the third representation.

In some embodiments, the at least one memory and the computer program code are further configured to, with the processor, cause the apparatus to encode a fourth representation, the fourth representation being non-overlapping with and adjacent to the first representation, the background viewport covering the fourth representation, encode the second representation as a region-of-interest scalable layer over one or both of the first representation and the fourth representation. In some embodiments, the second representation covers a fraction of coding blocks compared to the first representation and the fourth representation.

In some embodiments, a computer program product may be provided comprising at least one non-transitory computer-readable storage medium having computer-executable program code instructions stored therein, the computer-executable program code instructions comprising program code instructions for selecting a primary viewport, encoding a first representation that covers the primary viewport, and encoding a second representation that provides a gradual picture quality change from a background viewport to the primary viewport.

In some embodiments, the computer-executable program code instructions further comprise program code instructions for selecting a tile grid in a manner that the first representation and the second representation are non-overlapping and adjacent. In some embodiments, the computer-executable program code instructions further comprise program code instructions for encoding the first representation as a first motion-constrained tile set and the second representation as a second motion-constrained tile set. In some embodiments, the computer-executable program code instructions further comprise program code instructions for encoding a third representation, the third representation being non-overlapping with and adjacent to the second representation and non-adjacent to the first representation, the background viewport covering the third representation, selecting the tile grid in a manner that the second representation occupies a fraction of coding blocks compared to the first representation and the third representation.

In some embodiments, the computer-executable program code instructions further comprise program code instructions for encoding a fourth representation, the fourth representation being non-overlapping with and adjacent to the first representation, the background viewport covering the fourth representation, encoding the second representation as a region-of-interest scalable layer over one or both of the first representation and the fourth representation. In some embodiments, the second representation covers a fraction of coding blocks compared to the first representation and the fourth representation.

In some embodiments, a method may be provided comprising obtaining a primary viewport, selecting, obtaining, and decoding a first representation that covers the primary viewport, selecting, obtaining, and decoding a second representation that provides a gradual picture quality change from a background viewport to the primary viewport. In some embodiments, the method may further comprise obtaining the primary viewport based on an orientation and a field of view of a head-mounted display used for rendering one or both of the first representation and the second representation. In some embodiments, the first representation and the second representation are non-overlapping and adjacent.

In some embodiments, the first representation is a first motion-constrained tile set and the second representation is a second motion-constrained tile set. In some embodiments, the method may further comprise decoding the first representation as the first motion-constrained tile set and the second representation as the second motion-constrained tile set. In some embodiments, the method may further comprise obtaining and decoding a third representation, the third representation being non-overlapping with and adjacent to the second representation and non-adjacent to the first representation, the background viewport covering the third representation, wherein the second representation occupies a fraction of coding blocks compared to the first representation and the third representation. In some embodiments, the method may further comprise obtaining and decoding a fourth representation, the fourth representation being non-overlapping with and adjacent to the first representation, the background viewport covering the fourth representation, and obtaining and decoding the second representation as a region-of-interest scalable layer over one or both of the first representation and the fourth representation.

In some embodiments, an apparatus may be provided, the apparatus comprising at least one processor and at least one memory including computer program code, the at least one memory and the computer program code configured to, with the processor, cause the apparatus to at least obtain a primary viewport, select, obtaining, and decoding a first representation that covers the primary viewport, select, obtain, and decode a second representation that provides a gradual picture quality change from a background viewport to the primary viewport.

In some embodiments, the at least one memory and the computer program code are further configured to, with the processor, cause the apparatus to obtain the primary viewport based on an orientation and a field of view of a head-mounted display used for rendering one or both of the first representation and the second representation. In some embodiments, the first representation and the second representation are non-overlapping and adjacent.

In some embodiments, the first representation is a first motion-constrained tile set and the second representation is a second motion-constrained tile set, and wherein the at least one memory and the computer program code are further configured to, with the processor, cause the apparatus to decode the first representation as the first motion-constrained tile set and the second representation as the second motion-constrained tile set.

In some embodiments, the at least one memory and the computer program code are further configured to, with the processor, cause the apparatus to obtain and decode a third representation, the third representation being non-overlapping with and adjacent to the second representation and non-adjacent to the first representation, the background viewport covering the third representation, wherein the second representation occupies a fraction of coding blocks compared to the first representation and the third representation.

In some embodiments, the at least one memory and the computer program code are further configured to, with the processor, cause the apparatus to obtain and decode a fourth representation, the fourth representation being non-overlapping with and adjacent to the first representation, the background viewport covering the fourth representation, and obtain and decode the second representation as a region-of-interest scalable layer over one or both of the first representation and the fourth representation.

In some embodiments, a computer program product may be provided comprising at least one non-transitory computer-readable storage medium having computer-executable program code instructions stored therein, the computer-executable program code instructions comprising program code instructions for obtaining a primary viewport, selecting, obtaining, and decoding a first representation that covers the primary viewport, selecting, obtaining, and decoding a second representation that provides a gradual picture quality change from a background viewport to the primary viewport.

In some embodiments, the computer-executable program code instructions further comprise program code instructions for obtaining the primary viewport based on an orientation and a field of view of a head-mounted display used for rendering one or both of the first representation and the second representation. In some embodiments, the first representation and the second representation are non-overlapping and adjacent.

In some embodiments, the first representation is a first motion-constrained tile set and the second representation is a second motion-constrained tile set, and wherein the computer-executable program code instructions further comprise program code instructions for decoding the first representation as the first motion-constrained tile set and the second representation as the second motion-constrained tile set. In some embodiments, the computer-executable program code instructions further comprise program code instructions for obtaining and decoding a third representation, the third representation being non-overlapping with and adjacent to the second representation and non-adjacent to the first representation, the background viewport covering the third representation, wherein the second representation occupies a fraction of coding blocks compared to the first representation and the third representation.

In some embodiments, the computer-executable program code instructions further comprise program code instructions for obtaining and decoding a fourth representation, the fourth representation being non-overlapping with and adjacent to the first representation, the background viewport covering the fourth representation, and obtaining and decoding the second representation as a region-of-interest scalable layer over one or both of the first representation and the fourth representation.

BRIEF DESCRIPTION OF THE DRAWINGS

Figure 1:
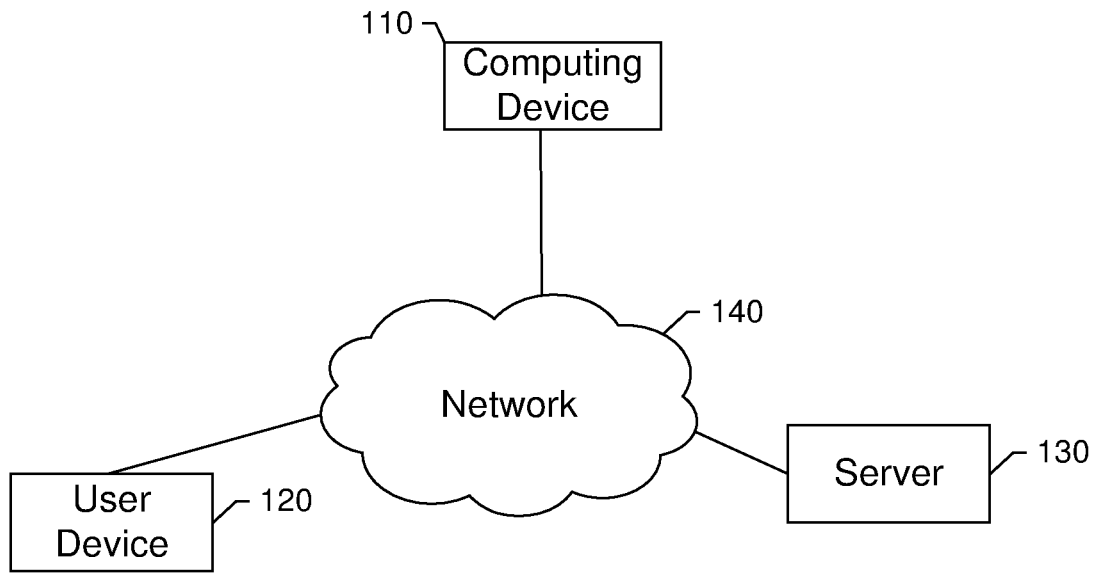
Figure 2:
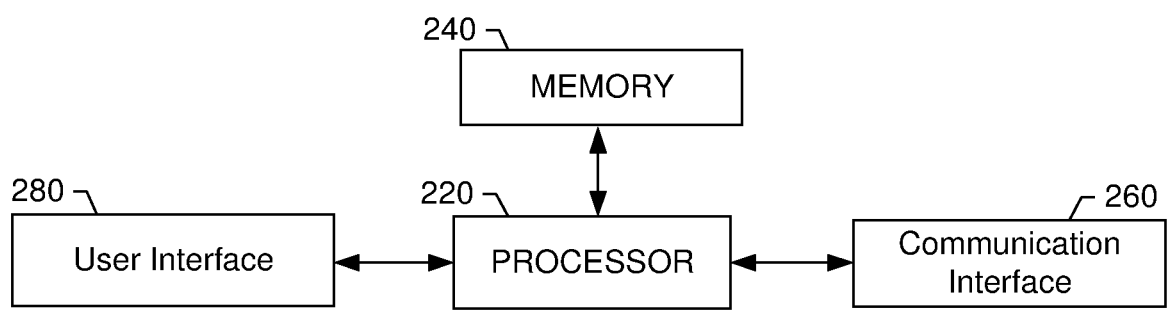
Figure 3:
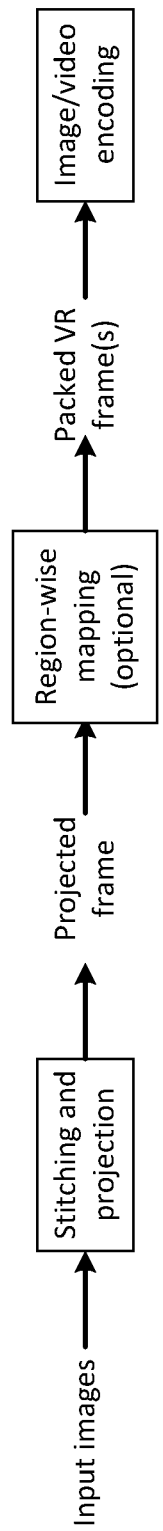

Having thus described embodiments of the invention in general terms, reference will now be made to the accompanying drawings, which are not necessarily drawn to scale, and wherein:

FIG. 1 is block diagram of a system that may be specifically configured in accordance with an example embodiment of the present invention;

FIG. 2 is a block diagram of an apparatus that may be specifically configured in accordance with an example embodiment of the present invention;

FIG. 3 shows an exemplary process for stitching, projection, and mapping of 360-degree image or video content in accordance with an example embodiment of the present invention.

Figure 4:
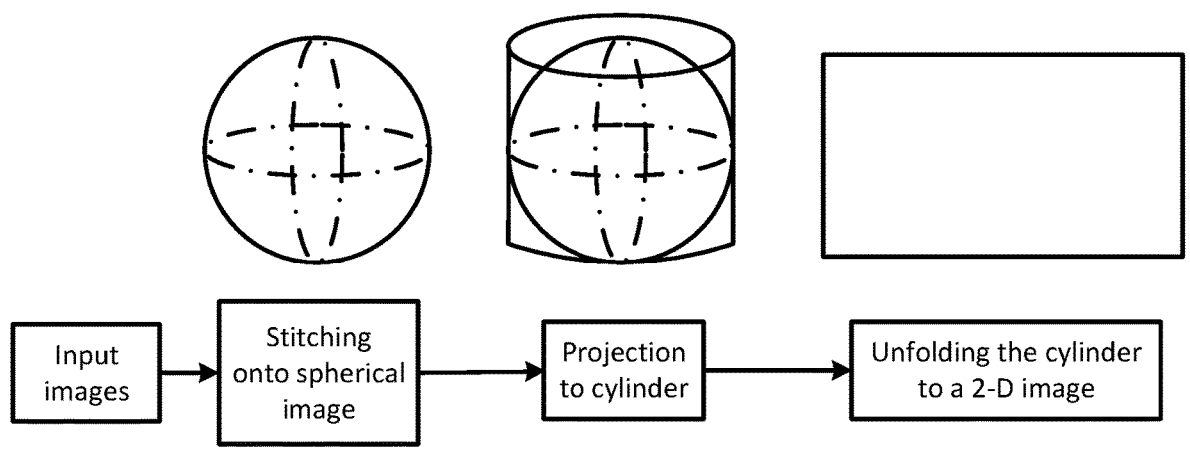
Figure 5:
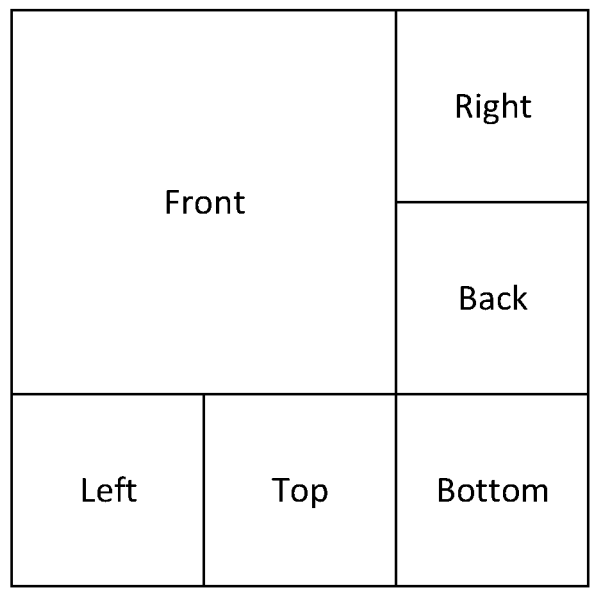
Figure 6A:
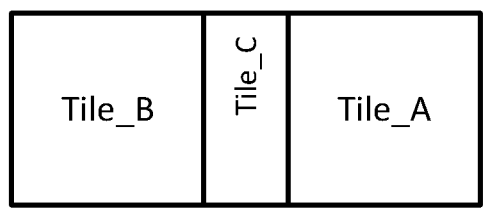
Figure 6B:
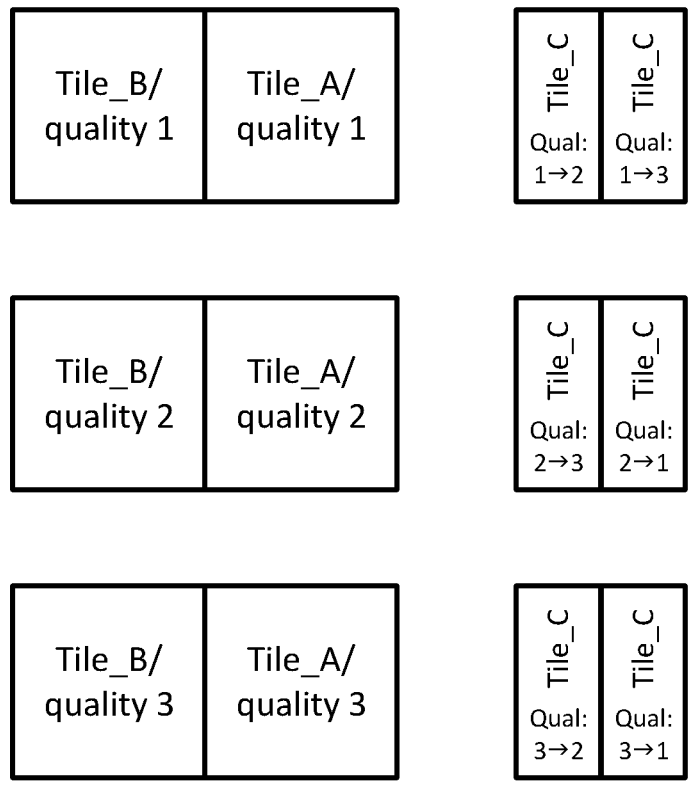
Figure 7:
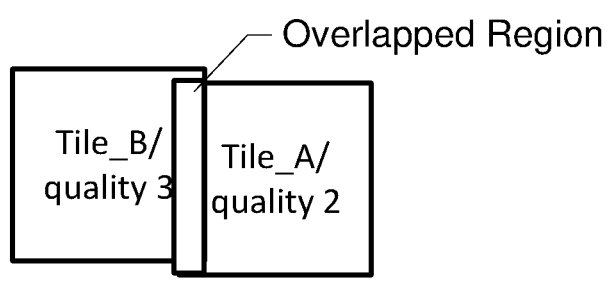
Figure 8A:
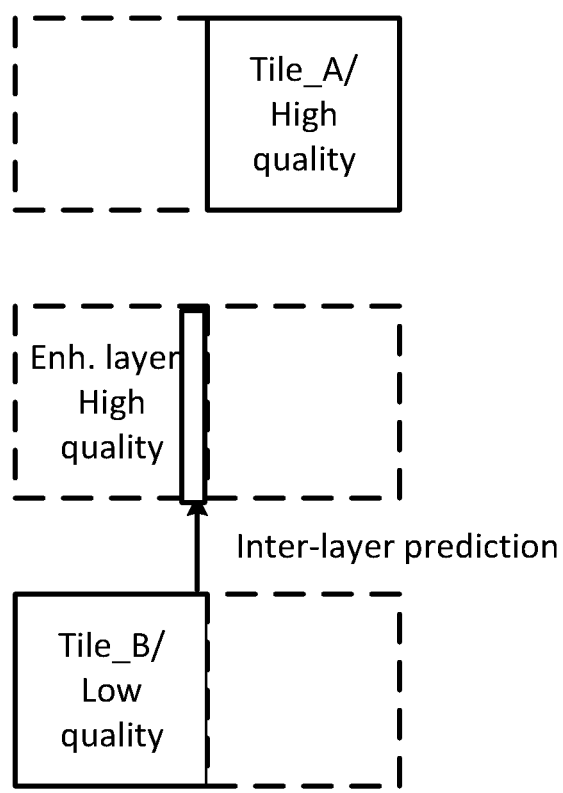
Figure 8B:
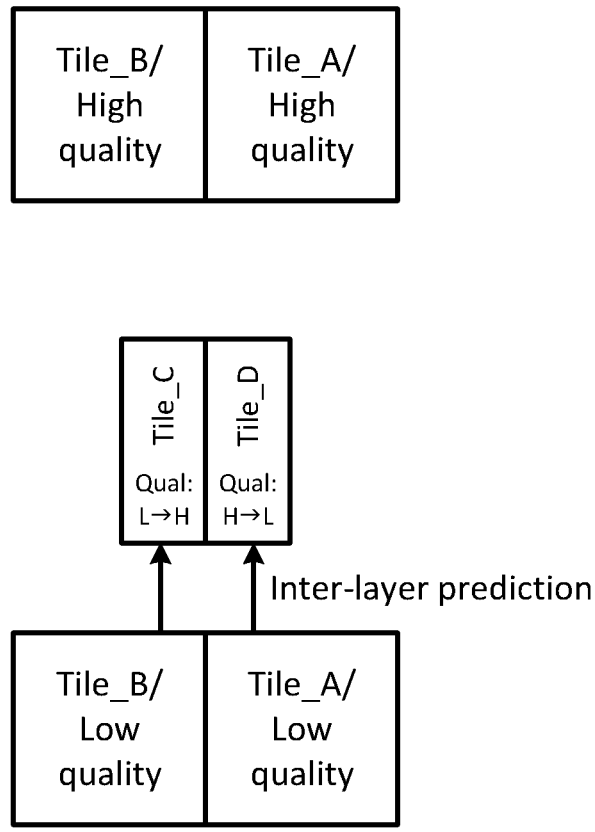
Figure 9:
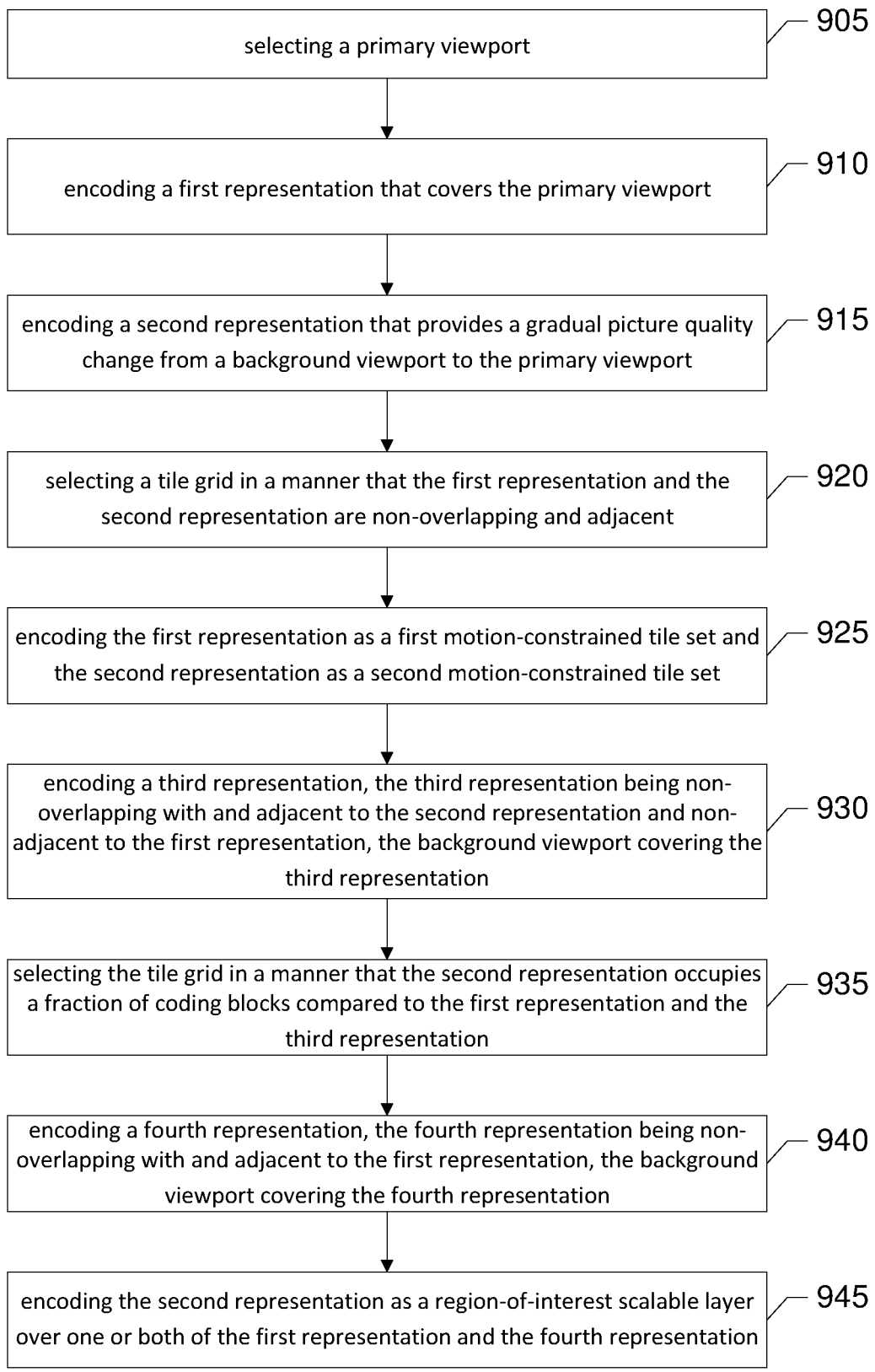
Figure 10:
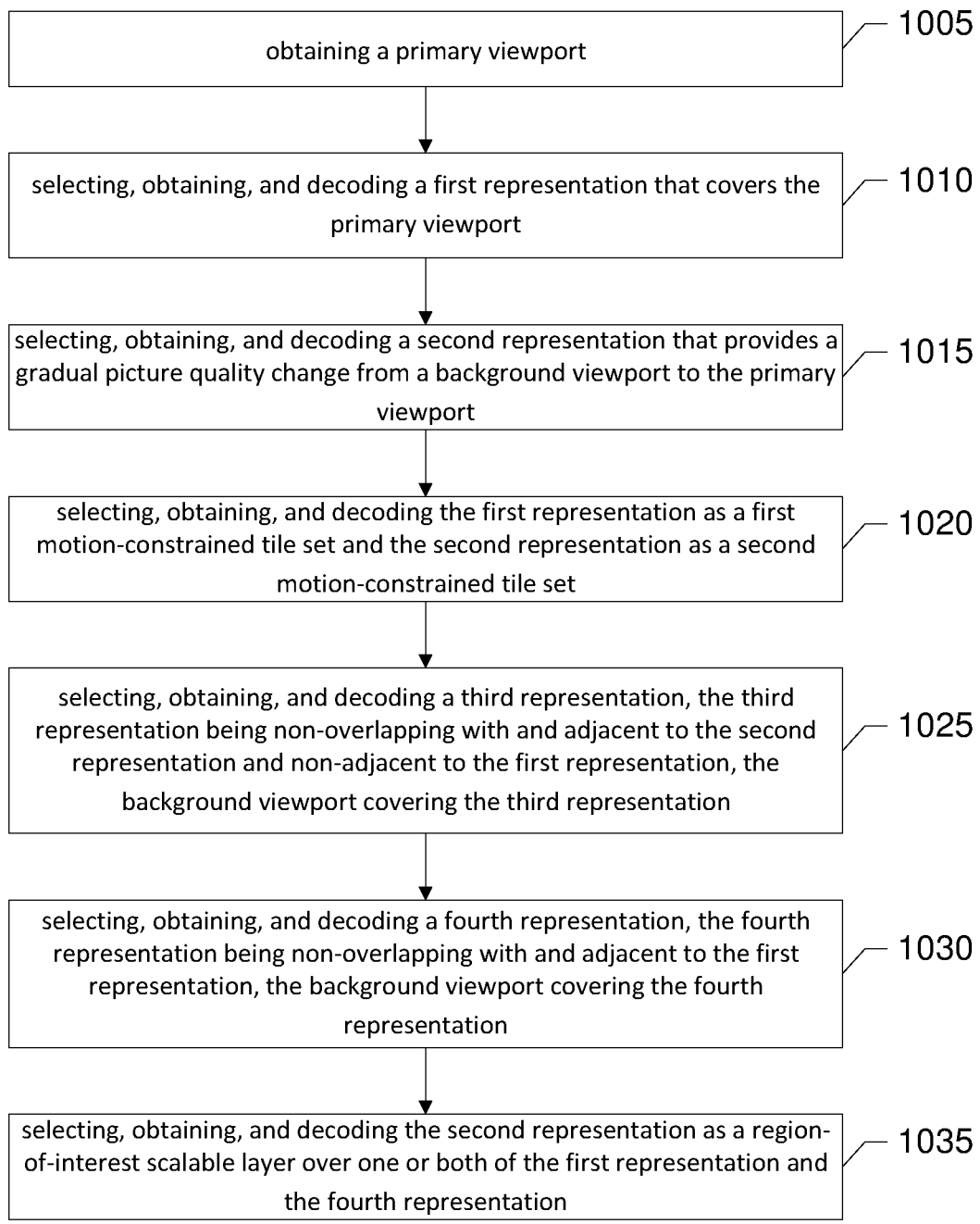

FIG. 4 shows an exemplary process for forming a monoscopic equirectangular panorama picture in accordance with an embodiment of the present invention;

FIG. 5 shows a frame by which 360-degree image content is packed into the same frame with an emphasis on the primary viewport, in accordance with an embodiment of the present invention;

FIG. 6A is a diagram showing an exemplary tile grid formed in a manner that a boundary area is enclosed in a separate tile from regions that have a stable picture quality, in accordance with an embodiment of the present invention;

FIG. 6B is a diagram showing an embodiment in which three versions of each stable-quality tile are encoded, in accordance with an embodiment of the present invention;

FIG. 6C is a diagram showing an exemplary process for selecting tiles for processing, in accordance with an embodiment of the present invention;

FIG. 7 is a diagram showing an embodiment in which two tiles overlap;

FIG. 8A is a diagram showing the use of scalable coding for encoding a boundary area, in accordance with an embodiment of the present invention;

FIG. 8B is a diagram showing the boundary area within the enhancement layer providing a gradual quality change, in accordance with an embodiment of the present invention;

FIG. 8C is a diagram showing, depending on which tile covers the primary viewport, two configurations of tiles that may be processed, in accordance with an embodiment of the present invention;

FIG. 9 is an example flowchart illustrating a method of operating an example apparatus in accordance with an embodiment of the present invention; and FIG. 10 is an example flowchart illustrating a method of operating an example apparatus in accordance with an embodiment of the present invention.

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or application specific integrated circuit for a mobile phone or a similar integrated circuit in a server, a cellular network device, or other network device.

Hardware

Referring now of FIG. 1, a system that supports communication, either wirelessly or via a wireline, between a computing device 110, a user device 120, and a server 130 or other network entity (hereinafter generically referenced as a "server") is illustrated. As shown, the computing device and the server may be in communication via a network 140, such as a wide area network, such as a cellular network or the Internet or a local area network. However, the computing device and the server may be in communication in other manners, such as via direct communications between the computing device and the server.

The computing device 110 may be embodied by a number of different devices including mobile computing devices, such as a personal digital assistant (PDA), mobile telephone, smartphone, laptop computer, tablet computer, or any combination of the aforementioned, and other types of voice and text communications systems. Alternatively, the computing device may be a fixed computing device, such as a personal computer, a computer workstation or the like. User device 120 may also be embodied by a computing device and, in one embodiment, is embodied by a head-mounted display. Server 130 may also be embodied by a computing device and, in one embodiment, is embodied by a web server. Additionally, while the system of FIG. 1 depicts a single server, the server may be comprised of a plurality of servers which may collaborate to support browsing activity conducted by the computing device.

Regardless of the type of device that embodies the computing device 110, user device 120, or server 130, the computing device may include or be associated with an apparatus 200 as shown in FIG. 2. In this regard, the apparatus may include or otherwise be in communication with a processor 220, a memory device 240, a communication interface 260 and a user interface 280. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 220 (and/or co-processors or any other processing circuitry assisting or otherwise associated with the processor) may be in communication with the memory device 240 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 200 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by a computing device 110 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 220 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 220 may be configured to execute instructions stored in the memory device 240 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 280.

Meanwhile, the communication interface 260 may be any means such as a device or circuitry embodied in either hardware or a combination of hardware and software that is configured to receive and/or transmit data between the computing device 110, user device 120, and server 130. In this regard, the communication interface 260 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the user device 120, which may be embodied by, for example, a head mounted display, such as via Wi-Fi, Bluetooth, 3G/4G/5G mobile network or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB), local area network (LAN) or other mechanisms. For example, the communication interface may be configured to communicate via wired communication with other components of the computing device.

The user interface 280 may be in communication with the processor 220, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 240 and/or the communication interface 260, such as via a bus.

The network 140 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. In this regard, the communications interface 260 may be capable of operating with one or more air interface standards, communication protocols, modulation types, access types, and/or the like. More particularly, the system 100, the communications interface 260 or the like may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

In an example embodiment, components/modules of the system may be implemented using standard programming techniques. For example, the system may be implemented as a "native" executable running on the processor 220, along with one or more static or dynamic libraries. In other embodiments, the system may be implemented as instructions processed by a virtual machine that executes as one of the other programs. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the system, can be made available by standard mechanisms such as through C, C++, C#, and Java APIs; libraries for accessing files, databases, or other data repositories; through languages such as XML; or through Web servers, FTP servers, or other types of servers providing access to stored data. A data store may also be included and it may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the system may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Some or all of the system components and data structures may also be stored as a web application, "app", or any HTML5 or JavaScript™ application, such as a computer software application that is coded in a browser-supported programming language (such as JavaScript™) combined with a browser-rendered markup language like HTML5, reliant on a common web browser to render the application executable. The opening of a web page or "app" may be performed by a web browser on a user device 120. An HTML5 or JavaScript™ "app" allows web page script to contact a server 130, such as those shown in FIG. 1, for storing and retrieving data without the need to re-download an entire web page. Some or all of the system components and data structures may also be stored as a privileged web application or privileged web app. A privileged web app is a piece of web content that may have been verified by, for example, means of an app store or stores or may have obtained or downloaded from a source that is trusted source. A trusted source may provide a privileged web app that may be enabled to override the default power settings. Such computer program products may also take other forms in other embodiments. Accordingly, embodiments of this disclosure may be practiced with other computer system configurations.

Embodiments disclosed herein relate to omnidirectional video captured with one or more cameras, streamed over a network, and rendered on a HMD. The present invention is directed to improving the visual quality of viewport-based omnidirectional video streaming, and in particular, concealing the sharp resolution and/or improving the quality at viewport boundaries.

Several commercial solutions for adaptive streaming over HTTP, such as Microsoft® Smooth Streaming, Apple® Adaptive HTTP Live Streaming and Adobe® Dynamic Streaming, have been launched as well as standardization projects for Dynamic Adaptive Streaming over HTTP (DASH) have been carried out. MPEG DASH (ISO/IEC 23009-1) and 3GP-DASH (3GPP TS 26.247) are technically close to each other and may therefore be collectively referred to as DASH. Some concepts, formats, and operations of DASH are described below as an example of a video streaming system, wherein the embodiments may be implemented. The aspects of the invention are not limited to DASH, but rather the description is given for one possible basis on top of which the invention may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MDP provides the necessary information for clients to establish a dynamic adaptive streaming over HTTP. The MPD contains information describing media presentation, such as an HTTP-uniform resource locator (URL) of each Segment to make GET Segment request. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

In DASH, a hierarchical data model is used to structure media presentation. A media presentation consists of a sequence of one or more Periods, each Period contains one or more Groups, each Group contains one or more Adaptation Sets, each Adaptation Sets contains one or more Representations, each Representation consists of one or more Segments. A Representation is one of the alternative choices of the media content or a subset thereof typically differing by the encoding choice, e.g. by bitrate, resolution, language, codec, etc. The Segment contains certain duration of media data, and metadata to decode and present the included media content. A Segment is identified by a URI and can typically be requested by a HTTP GET request. A Segment may be defined as a unit of data associated with an HTTP-URL and optionally a byte range that are specified by an MPD.

A DASH service may be provided as on-demand service or live service. In the former, the MPD is a static and all Segments of a Media Presentation are already available when a content provider publishes an MPD. In the latter, however, the MPD may be static or dynamic depending on the Segment URLs construction method employed by a MPD and Segments are created continuously as the content is produced and published to DASH clients by a content provider. Segment URLs construction method may be either template-based Segment URLs construction method or the Segment list generation method. In the former, a DASH client is able to construct Segment URLs without updating an MPD before requesting a Segment. In the latter, a DASH client has to periodically download the updated MPDs to get Segment URLs. For live service, hence, the template-based Segment URLs construction method is superior to the Segment list generation method.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

An Initialization Segment may be defined as a Segment containing metadata that is necessary to present the media streams encapsulated in Media Segments. In ISO Base Media File Format (ISOBMFF) based segment formats, an Initialization Segment may comprise the Movie Box ('moov') which might not include metadata for any samples, i.e. any metadata for samples is provided in 'moof' boxes.

A Media Segment contains certain duration of media data for playback at a normal speed, such duration is referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration is typically a lower bound on the end-to-end latency perceived by a DASH client since a Segment is a discrete unit of generating media data for DASH. Content generation is typically done such a manner that a whole Segment of media data is made available for a server. Furthermore, many client implementations use a Segment as the unit for GET requests. Thus, in typical arrangements for live services a Segment can be requested by a DASH client only when the whole duration of Media Segment is available as well as encoded and encapsulated into a Segment. For on-demand service, different strategies of selecting Segment duration may be used.

A segment may be further partitioned into subsegments, for example, to enable downloading segments in multiple parts. Subsegments may be required to contain complete access units. Subsegments may be indexed by Segment Index box, which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using byte range HTTP request. If relatively long Segment duration is used, then Subsegments may be used to keep the size of HTTP responses reasonable and flexible for bitrate adaptation. The indexing information of a segment may be put in the single box at the beginning of that segment, or spread among many indexing boxes in the segment. Different methods of spreading are possible, such as hierarchical, daisy chain, and hybrid. This technique may avoid adding a large box at the beginning of the segment and therefore may prevent a possible initial download delay.

The notation (Sub)segment refers to either a Segment or a Subsegment. If Segment Index boxes are not present, the notation (Sub)segment refers to a Segment. If Segment Index boxes are present, the notation (Sub)segment may refer to a Segment or a Subsegment, e.g. depending on whether the client issues requests on Segment or Subsegment basis.

MPEG-DASH defines segment-container formats for both ISO Base Media File Format and MPEG-2 Transport Streams. Other specifications may specify segment formats based on other container formats. For example, a segment format based on Matroska container file format has been proposed.

DASH supports rate adaptation by dynamically requesting Media Segments from different Representations within an Adaptation Set to match varying network bandwidth. When a DASH client switches up/down Representation, coding dependencies within Representation have to be taken into account. A Representation switch may only happen at a random access point (RAP), which is typically used in video coding techniques such as H.264/AVC. In DASH, a more general concept named Stream Access Point (SAP) is introduced to provide a codec-independent solution for accessing a Representation and switching between Representations. In DASH, a SAP is specified as a position in a Representation that enables playback of a media stream to be started using only the information contained in Representation data starting from that position onwards (preceded by initializing data in the Initialization Segment, if any). Hence, Representation switching can be performed in SAP.

Streaming systems similar to MPEG-DASH include for example HTTP Live Streaming (a.k.a. HLS), specified in the IETF Internet Draft draft-pantos-http-live-streaming-13 (and other versions of the same Internet Draft). As a manifest format corresponding to the MPD, HLS uses an extended M3U format. M3U is a file format for multimedia playlists, originally developed for audio files. An M3U Playlist is a text file that consists of individual lines, and each line is a URI, blank, or starts with the character '#' indicating a tag or a comment. A URI line identifies a media segment or a Playlist file. Tags begin with #EXT. The HLS specification specifies a number of tags, which may be regarded as key-value pairs. The value part of tags may comprise an attribute list, which is a comma-separated list of attribute-value pairs, where an attribute-value pair may be considered to have the syntax AttributeName= AttributeValue. Hence, tags of HLS M3U8 files may be considered similar to Elements in MPD or XML, and attributes of HLS M3U8 files may be considered similar to Attributes in MPD or XML. Media segments in HLS may be formatted according to the MPEG-2 Transport Stream and contain a single MPEG-2 Program. Each media segment is recommended to start with a Program Association Table (PAT) and a Program Map Table (PMT). Media segments in later versions of HLS may be compliant with ISOBMFF. Other streaming systems include transport protocols such as the Real Time Protocol (RTP).

Embodiments disclosed herein will now be described in the context of HEVC. HEVC is a video compression standard, and was developed by the Joint Collaborative Team on Video Coding (JCT-VC) of VCEG and MPEG. The HEVC standard is published by both parent standardization organizations, and is referred to as ITU-T Recommendation H.265 and ISO/IEC International Standard 23008-2, also known as MPEG-H Part 2 High Efficiency Video Coding (HEVC). There are currently ongoing standardization projects to develop extensions to HEVC.

In the HEVC standard, a picture can be partitioned into tiles, which are rectangular and contain an integer number of coding tree units (CTUs). In the HEVC standard, the partitioning into tiles forms a grid that may be characterized by a list of tile column widths (in CTUs) and a list of tile row heights (in CTUs). Tiles are ordered in the bit stream consecutively in the raster scan order of the tile grid. A tile may contain an integer number of slices.

In the HEVC standard, a slice consists of an integer number of CTUs. The CTUs are scanned in the raster scan order of CTUs within tiles or within a picture, if tiles are not in use. A slice may contain an integer number of tiles or a slice can be contained in a tile. Within a CTU, the CUs have a specific scan order. As one of ordinary skill is aware, additional information related to picture partitioning is available in section 6.3.1 of the HEVC standard.

A motion-constrained tile set is such that the inter prediction process is constrained during encoding such that no referenced sample value is outside the motion-constrained tile set, and no sample value at a fractional sample position that is derived using one or more sample values outside the motion-constrained tile set, is used for inter prediction of any sample within the motion-constrained tile set.

Note that sample locations used in inter prediction may be saturated so that a location that would be outside the picture otherwise is saturated to point to the corresponding boundary sample of the picture. Hence, if a tile boundary is also a picture boundary, motion vectors may effectively cross that boundary or a motion vector may effectively cause fractional sample interpolation that would refer to a location outside that boundary, since the sample locations are saturated onto the boundary.

A supplemental enhancement information (SEI) message of HEVC can be used to indicate the presence of motion-constrained tile sets in the bit stream.

Scalable video coding may refer to coding structure where one bitstream can contain multiple representations of the content, for example, at different bitrates, resolutions or frame rates. In these cases the receiver can extract the desired representation depending on its characteristics (e.g., resolution that matches best the display device). Alternatively, a server or a network element can extract the portions of the bitstream to be transmitted to the receiver depending on e.g. the network characteristics or processing capabilities of the receiver. A meaningful decoded representation can be produced by decoding only certain parts of a scalable bit stream. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. For example, the motion and mode information of the enhancement layer can be predicted from lower layers. Similarly, the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

It should be understood that many of the scalability types may be combined and applied together. Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer. Quality scalability may be further categorized into fine-grain or fine-granularity scalability (FGS), medium-grain or medium-granularity scalability (MGS), and/or coarse-grain or coarse-granularity scalability (CGS), as described below.

Spatial scalability: Base layer pictures are coded at a lower resolution (i.e. have fewer samples) than enhancement layer pictures. Spatial scalability and quality scalability, particularly its coarse-grain scalability type, may sometimes be considered the same type of scalability.

Bit-depth scalability: Base layer pictures are coded at lower bit-depth (e.g. 8 bits) than enhancement layer pictures (e.g., 10 or 12 bits).

Dynamic range scalability: Scalable layers represent a different dynamic range and/or images obtained using a different tone mapping function and/or a different optical transfer function.

Chroma format scalability: Base layer pictures provide lower spatial resolution in chroma sample arrays (e.g., coded in 4:2:0 chroma format) than enhancement layer pictures (e.g., 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

Region-of-interest (ROI) scalability. ROI scalability may be defined as a type of scalability wherein an enhancement layer enhances only part of a reference-layer picture e.g. spatially, quality-wise, in bit-depth, and/or along other scalability dimensions. As ROI scalability may be used together with other types of scalabilities, it may be considered to form a different categorization of scalability types. There exist several different applications for ROI coding with different requirements, which may be realized by using ROI scalability. For example, an enhancement layer can be transmitted to enhance the quality and/or a resolution of a region in the base layer. A decoder receiving both enhancement and base layer bitstream might decode both layers and overlay the decoded pictures on top of each other and display the final picture.

As used herein, the terms 360-degree video or virtual reality (VR) video may be used interchangeably. Each may generally refer to video content that provides a sufficiently large field of view (FOV) such that only a part of the video is displayed at a single point of time in typical displaying arrangements. For example, VR video may be viewed on a head-mounted display (HMD) that may be capable of displaying e.g. about 100-degree field of view. The spatial subset of the VR video content to be displayed may be selected based on the orientation of the HMD. In another example, a typical flat-panel viewing environment is assumed, wherein e.g. up to 40-degree field-of-view may be displayed. When displaying wide-FOV content (e.g. fisheye) on such a display, it may be preferred to display a spatial subset rather than the entire picture.

360-degree image or video content may be acquired and prepared for example as follows. Images or video can be captured by a set of cameras or a camera device with multiple lenses and sensors. The acquisition results in a set of digital image/video signals. The cameras/lenses typically cover all directions around the center point of the camera set or camera device. The images of the same time instance are stitched, projected, and mapped onto a packed VR frame. FIG. 3 shows an exemplary process for stitching, projection, and mapping of 360-degree image or video content and is described as follows. Input images are stitched and projected onto a three-dimensional projection structure, such as a sphere or a cube. The projection structure may be considered to comprise one or more surfaces, such as plane(s) or part(s) thereof. A projection structure may be defined as three-dimensional structure consisting of one or more surface(s) on which the captured VR image/video content is projected, and from which a respective projected frame can be formed. The image data on the projection structure is further arranged onto a two-dimensional projected frame. The term projection may be defined as a process by which a set of input images are projected onto a projected frame. There may be a pre-defined set of representation formats of the projected frame, including for example an equirectangular panorama and a cube map representation format.

Region-wise mapping may be applied to map projected frame onto one or more packed VR frames. In some cases, region-wise mapping may be understood to be equivalent to extracting two or more regions from the projected frame, optionally applying a geometric transformation (such as rotating, mirroring, and/or resampling) to the regions, and placing the transformed regions in spatially non-overlapping areas, a.k.a. constituent frame partitions, within the packed VR frame. If the region-wise mapping is not applied, the packed VR frame is identical to the projected frame. Otherwise, regions of the projected frame are mapped onto a packed VR frame by indicating the location, shape, and size of each region in the packed VR frame. The term mapping may be defined as a process by which a projected frame is mapped to a packed VR frame. The term packed VR frame may be defined as a frame that results from a mapping of a projected frame. In practice, the input images may be converted to a packed VR frame in one process without intermediate steps.

360-degree panoramic content (i.e., images and video) cover horizontally the full 360-degree field-of-view around the capturing position of an imaging device. The vertical field-of-view may vary and can be e.g. 180 degrees. Panoramic images covering a 360-degree field-of-view horizontally and 180-degree field-of-view vertically can be represented by a sphere that has been mapped to a two-dimensional image plane using equirectangular projection. In this case, the horizontal coordinate may be considered equivalent to a longitude, and the vertical coordinate may be considered equivalent to a latitude, with no transformation or scaling applied. The process of forming a monoscopic equirectangular panorama picture is illustrated in the FIG. 4. A set of input images, such as fisheye images of a camera array or a camera device with multiple lenses and sensors, is stitched onto a spherical image. The spherical image is further projected onto a cylinder (without the top and bottom faces). The cylinder is unfolded to form a two-dimensional projected frame. In practice one or more of the presented steps may be merged; for example, the input images may be directly projected onto a cylinder without an intermediate projection onto a sphere. The projection structure for equirectangular panorama may be considered to be a cylinder that comprises a single surface.

In general, 360-degree content can be mapped onto different types of solid geometrical structures, such as polyhedron (i.e. a three-dimensional solid object containing flat polygonal faces, straight edges and sharp corners or vertices, e.g., a cube or a pyramid), cylinder (by projecting a spherical image onto the cylinder, as described above with the equirectangular projection), cylinder (directly without projecting onto a sphere first), cone, etc. and then unwrapped to a two-dimensional image plane.

In some cases, panoramic content with a 360-degree horizontal field-of-view may have a vertical field-of-view less than 180 degrees. Such content may be considered special cases of equirectangular projection, where the polar areas of the sphere have not been mapped onto the two-dimensional image plane. In some cases, a panoramic image may have less than 360-degree horizontal field-of-view and up to 180-degree vertical field-of-view, while otherwise having the characteristics of equirectangular projection format.

The human eyes are not capable of viewing the whole 360 degree space, but are limited to a maximum horizontal and vertical fields of view (FoVs) (HHFoV, HVFoV). Also, a HMD device has technical limitations that allow only viewing a subset of the whole 360 degrees space in horizontal and vertical directions (DHFoV, DVFoV).

At any point in time, a video rendered by an application on a HMD renders a portion of the 360 degree video. This portion is defined here as a viewport. A viewport is a window on the 360 degree world represented in the omnidirectional video displayed via a rendering display. A viewport is characterized by horizontal and vertical FoVs (VHFoV, VVFoV). In the following, VHFoV and VVFoV will be simply abbreviated with HFoV and VFoV.

A viewport size may correspond to the HMD FoV or may have a smaller size, depending on the application. For the sake of clarity, we define the primary viewport to be the part of the 360 degrees space viewed by a user at any given point of time. A background viewport (i.e., non-visible viewport) may be defined as the part of the 360-degree content that is not covered by the primary viewport.

In some embodiments, to reduce the streaming bitrate of VR video, a subset of 360-degree video content covering the primary viewport (i.e., the current view orientation) is transmitted at a high (e.g., meeting a predefined threshold) quality/resolution, while at least a part of the remaining of 360-degree video is transmitted at a lower quality/resolution.

There are generally two approaches for viewport-adaptive streaming:

1. Viewport-specific encoding and streaming, a.k.a. viewport-dependent encoding and streaming, a.k.a. asymmetric projection, a.k.a. packed VR video.

In this approach, 360-degree image content is packed into the same frame with an emphasis (e.g. greater spatial area) on the primary viewport. The packed VR frames are encoded into a single bitstream.

For example, the front face of a cube map may be sampled with a higher resolution compared to other cube faces and the cube faces may be mapped to the same packed VR frame as follows:

FIG. 5 shows a frame by which 360-degree image content is packed into the same frame with an emphasis (e.g. greater spatial area) on the primary viewport.

2. VR viewport video, a.k.a. tile-based encoding and streaming.

In this approach, 360-degree content is encoded and made available in a manner that enables selective streaming of viewports from different encodings.

An approach of tile-based encoding and streaming, which may be referred to as tile rectangle based encoding and streaming or sub-picture based encoding and streaming, may be used with any video codec, even if tiles similar to HEVC were not available in the codec or even if motion-constrained tile sets or alike were not implemented in an encoder. In tile rectangle based encoding, the source content is split into tile rectangle sequences (i.e., sub-picture sequences) before encoding. Each tile rectangle sequence covers a subset of the spatial area of the source content, such as full panorama content, which may, for example, be of equi-rectangular projection format. Each tile rectangle sequence is then encoded independently from each other as a single-layer bitstream. Several bit streams may be encoded from the same tile rectangle sequence, e.g. for different bitrates. Each tile rectangle bitstream may be encapsulated in a file as its own track (or alike) and made available for streaming. At the receiver side the tracks to be streamed may be selected based on the viewing orientation. The client may receive tracks covering the entire omnidirectional content.

Better quality or higher resolution tracks may be received for the current viewport compared to the quality or resolution covering the remaining, currently non-visible viewports. In an example, each track may be decoded with a separate decoder instance.

In an example of tile rectangle based encoding and streaming, each cube face may be separately encoded and encapsulated in its own track (and representation). More than one encoded bit stream for each cube face may be provided, for example, each with different spatial resolution. Players can choose tracks (or representations) to be decoded and played based on the current viewing orientation. High-resolution tracks (or representations) may be selected for the cube faces used for rendering of the present viewing orientation, while the remaining cube faces may be obtained from their corresponding low-resolution tracks (or representations).

In an approach of tile-based encoding and streaming, encoding is performed in a manner that the resulting bitstream comprises motion-constrained tile sets. Several bit streams of the same source content are encoded using motion-constrained tile sets.

In an approach, one or more motion-constrained tile set sequences are extracted from a bitstream, and each extracted motion-constrained tile set sequence is stored as a tile set track (e.g., an HEVC tile track or a full-picture-compliant tile set track) in a file. A tile base track (e.g., an HEVC tile base track or a full picture track comprising extractors to extract data from the tile set tracks) may be generated and stored in a file. The tile base track represents the bitstream by implicitly collecting motion-constrained tile sets from the tile set tracks or by explicitly extracting (e.g., by HEVC extractors) motion-constrained tile sets from the tile set tracks. Tile set tracks and the tile base track of each bitstream may be encapsulated in an own file, and the same track identifiers may be used in all files. At the receiver side the tile set tracks to be streamed may be selected based on the viewing orientation. The client may receive tile set tracks covering the entire omnidirectional content. Better quality or higher resolution tile set tracks may be received for the current viewport compared to the quality or resolution covering the remaining, currently non-visible viewports.

In another example, equirectangular panorama content is encoded using motion-constrained tile sets. More than one encoded bit stream may be provided, for example, with different spatial resolution and/or picture quality. Each motion-constrained tile set is made available in its own track (and representation). Players may choose tracks (or representations) to be to be decoded and played based on the current viewing orientation. High-resolution or high-quality tracks (or representations) may be selected for tile sets covering the present primary viewport, while the remaining area of the 360-degree content may be obtained from low-resolution or low-quality tracks (or representations).

In some embodiments, the approaches described above may be combined.

That is, the 360 degrees space may be divided into a discrete set of viewports, each separate by a given distance (e.g., expressed in degrees), such that the omnidirectional space may be imagined as a map of overlapping viewports, and the primary viewport may be switched discretely as the user changes his/her orientation while watching content with a HMD. When the overlap between viewports is reduced to zero, the viewports may be imagined as adjacent non-overlapping tiles within the 360 degree space.

Region Overlapping in Packed VR Video

In the context of packed VR video, the regions may overlap in the spherical domain to conceal boundary effects. Overlapped regions may help in various aspects causing boundary effects, including the following: (1) The boundary may be made smoother by dissolving the content from one region to another by gradual blending within the area where the regions overlap; (2) If loop filtering, such as deblocking loop filtering, is applied, the picture content of one area may affect the pixel values of another region, even if the pixels were not adjacent in the spherical domain; and (3) The boundary between regions is often sharp, which may cause ringing artefacts to appear due to the video coding.

However, overlapping regions have at least the following disadvantages: (1) The rate-distortion performance may decrease compared to non-overlapping regions, because a part of the picture content is encoded multiple times; and (2) Overlapping regions make some encoding arrangements impossible. Most notably, it is not possible to use encoding with motion-constrained tile sets and make both the entire bitstream (e.g. representing the full 360-degree content, with its native format, such equirectangular panorama) as well as the individual tiles available. Such an arrangement requires non-overlapping tile sets.

In the present invention, two adjacent tiles Tile_A and Tile_B may be encoded using different qualities, where the first has a higher quality than the latter. Tiles typically cover a wider field of view than the expected display field of view. However, tiles may generally cover any display FoV. Tile_A is intended to cover the displayed field of view, and Tile_B is expected to be needed only if the viewing orientation changes from the expected viewing orientation (covered by Tile_A). Tile_B is therefore coded at a lower picture quality (e.g. higher quantization parameter, QP, of H.264/AVC or H.265/HEVC). In order to conceal the visible boundary between the tiles, a boundary region of the low quality tile (i.e., Tile_B) which is adjacent to the boundary of the two tiles (Tile_A and Tile_B) is encoded using the same parameters as the tile encoded at high quality (Tile_A). For example, FIG. 6A shows two adjacent tiles, each encoded using different qualities, and a boundary region adjacent to the two tiles belonging to the low quality tile (Tile_B) is encoded using the same parameters as the tile encoded at high quality (Tile_A). The boundary region may be covered in Tile_B or in Tile_A or in both tiles.

A similar reasoning may be applied irrespective of the position of the boundary area between Tile_A and Tile_B. For instance, the boundary area may be made of N horizontal pixels, if the boundary is vertical. Similarly, the boundary area could be made of N vertical pixels, if the boundary is horizontal. Also, the same invention could be applied to all N boundaries of a tile, perhaps using different encoding parameters for each of the N boundaries adjacent to N tiles, whenever they are encoded at different qualities. Moreover, embodiments described herein are applicable to both monoscopic and stereoscopic content.

The above described processes will be further described below.

Boundary Areas with Gradual Quality Change

In some embodiments, the boundary may be encoded with a gradual quality increase from the low quality tile (Tile_B) to the high quality tile (Tile_A). For example, the QP value may be gradually decreased, for example, CTU wise, from a QP value used in Tile_B to the QP value used in Tile_A. This gradual adjustment of QP may occur within Tile_B (i.e., the QP at the boundary of Tile_A is not purposely degraded), or it may occur within Tile_A, or it may span Tile_A and Tile_B such that the boundary region quality of Tile_B is gradually enhanced and the boundary region quality of Tile_A is gradually degraded in order for the quality at the tile boundary to be similar in each of Tile_A and Tile_B. The rate of QP change may be uniform or non-uniform, and may be linear or non-linear. The rate of QP change (a.k.a. QP gradient) may differ from one boundary to the next, and may differ from one boundary to the next. When determining the appropriate QP gradient, an encoder may employ rate control, i.e., it may take into consideration the bit rate objective for each of Tile_A and Tile_B and/or the total bit rate of all tiles in addition to the objective of minimizing QP difference across the boundary of Tile_A and Tile_B. This invention contemplates that, when utilizing such a rate control algorithm, the quality difference at the boundary of Tile_A and Tile_B may not be uniform along the boundary due to the operation and/or limitations of said rate control algorithm.

Boundary Areas with Gradual Quality Change Enclosed within Their Own Tiles

In some embodiments, a tile grid may be formed in a manner such that a boundary area is enclosed in a separate tile from regions that have a stable picture quality. FIG. 6A shows an example of such a tile grid.

Two or more versions of each stable-quality tile in the tile grid may be encoded at different picture qualities. A version of a boundary area tile may be coded for each possible pair of stable-quality tiles. Note that in general more than two stable-quality tiles may be adjacent to a boundary area tile, in which case the boundary area tile is coded for each combination of possible picture qualities of the adjacent stable-quality tiles. FIG. 6B shown an example of encoding three versions of each stable-quality tile, in which case six boundary area tiles are coded.

Picture quality may be adjusted in different embodiments through any available means in encoding and/or decoding. For example, picture quality may be adjusted using the quantization parameter (QP) of H.264/AVC or HEVC. QP adjusts the quantization step size for transform coefficients of coded residual blocks. In general, picture quality may comprise several quality aspects, such as sampling density or spatial resolution, chroma format, transform coefficient and/or sample value quantization (e.g. controlled by a quantization parameter, QP, of H.264/AVC or HEVC), bit depth, dynamic range, and color gamut. A first picture quality may be defined to be higher than a second picture quality when any quality aspect of the first picture quality is higher than or provides an enhanced perceived fidelity or quality compared to the respect quality aspect of the second picture quality, while the remaining quality aspects remain unchanged.

Out of the encoded set of tiles, tiles are selected for processing based e.g. on the current viewing orientation and the available transmission bandwidth. FIG. 6C shows an example of selecting tiles for processing at a single time. Processing may include e.g. one or both of transmission and decoding. In such embodiments, the selection of tiles may occur at the decoding device, e.g., a HMD or computing device connected to a HMD may identify the tile corresponding to the primary viewport, and tiles that are in the viewer's visual periphery. The decoding device may then determine, based upon information available to it describing the characteristics of boundary area tiles, how many and which of said boundary area tiles to display in order to present the viewer with the optimal visual experience. Said characteristics of boundary area tiles may, for example, be incorporated into a manifest such as a media presentation description (MPD) file. In such embodiments, the selection of tiles may alternatively occur at a transmitting point. For example, the decoding device may, as part of a request to the transmitting point, specify at least the primary viewport, and the transmitting point may then indicate to the decoder which boundary area tiles could be utilized.

Boundary Areas with Forced Coding Modes

In some embodiments, the N coding units (N>=1) adjacent to the boundary in the low quality tile (Tile_B) may be coded using modes that are selected in order to minimize the cross-boundary differences in the pixel domain, subject to a bit rate constraint. For example, in HEVC the CTUs adjacent to the boundary may be encoded in intra mode or transform skip mode in order to prevent motion artifacts. The use of transform skip mode permits the transition from higher to lower quality to occur within a CTU width of the boundary by pre-quantizing the video in a spatially non-uniform way within the CTU, rather than by adjustment of the QP value. In some embodiments, the number N of coding units and the mode restrictions is known to the decoder, e.g., deterministically or through signaling, and said decoder employs algorithmic optimizations in order to reduce the memory and/or number of operations involved in decoding the boundary. For example, a decoder aware of said mode restrictions may not need to store a reference picture that extends to the tile boundary. In some embodiments where the number N of coding units and the mode restrictions are known, the decoder may, deterministically or adaptively, perform post-processing in order to further improve the appearance of the tile boundary, e.g., mode restrictions may be used to determine the parameters of an out-of-loop filter.

Overlapping Tiles

FIG. 7 shows an embodiment in which Tile_A and Tile_B overlap. The boundary of Tile_A and Tile_B may be encoded twice (e.g., once in each tile) by repeating some amount of data. Tile_A may be encoded at a higher quality and Tile_B at a lower quality.

A blending filter may be applied to the overlapped boundary region. For example, a weighted sum of the corresponding point in Tile_A and Tile_B. The weightings may differ such that Tile_A is favored on the right of the overlapped region and Tile_B is favored on the left of the overlapped region of FIG. 7.

Signaling of the overlapped region may occur e.g. using the SRD in a DASH MPD.

In some embodiments, the simple filter used on the boundary may also be an asymmetric filter (such that the side of the boundary at high quality is weighted more than the other side), or replaced by a non-linear algorithm.

A general process using scalable video will now be described.

In multi-quality video bit streams, for example when tiles are encoded at k>2 qualities for allowing DASH bit streams switching, it could be advantageous to encode the boundaries of all encoded tiles using multiple qualities. The use of scalable coding for encoding a boundary area is illustrated in FIG. 8A.

In an embodiment the enhancement layer comprises only the boundary area. In an embodiment, the enhancement layer comprises only the area of Tile_B. The area within the enhancement layer that is outside the boundary area can be skip coded (i.e., coded in a manner that prediction error data is marked absent in the bitstream).

In an embodiment, the boundary area within the enhancement layer provides a gradual quality change. For example, in case of two tiles coded at two qualities, FIG. 8B shows a diagram identifying which tiles may be coded.

One tile of low quality, one enhancement-layer tile, and one tile of high quality may be processed at a single time. FIG. 8C shows, depending on which tile covers the primary viewport, two configurations of tiles that may be processed.

The necessary flexibility may be achieved by making use of scalable video bit streams, where k enhancement layers may carry k tile boundary data encoded at k quality levels and, through appropriate signaling, the client device may "use" only the quality level that best matches the situation.

In some embodiments, the enhancement layer and its reference layer may share the same sampling grid. If the enhancement layer is inter-layer predicted, no picture sample resampling process needs to be applied for the source picture for inter-layer prediction.

In some embodiments, the enhancement layer and its reference layer may use different sampling grids. The enhancement layer may essentially provide the same sampling density as the high quality tiles. If the enhancement layer is inter-layer predicted, picture sample resampling process is be applied for the source picture for inter-layer prediction to obtain an inter-layer reference picture.

The location of the enhancement layer with respect to the reference layer can be established in a video bit stream with reference layer location offsets of SHVC or alike, and/or in DASH MPD with a spatial relationship descriptor (SRD).

The spatial correspondence of a reference-layer picture and an enhancement-layer picture may be inferred or may be indicated with one or more types of so-called reference layer location offsets. In HEVC, reference layer location offsets may be included in a picture parameter set (PPS) by the encoder and decoded from the PPS by the decoder. Reference layer location offsets may be used for but are not limited to achieving ROI scalability. Reference layer location offsets may comprise one or more of scaled reference layer offsets, reference region offsets, and resampling phase sets. Scaled reference layer offsets may be considered to specify the horizontal and vertical offsets between the sample in the current picture that is collocated with the top-left luma sample of the reference region in a decoded picture in a reference layer and the horizontal and vertical offsets between the sample in the current picture that is collocated with the bottom-right luma sample of the reference region in a decoded picture in a reference layer. Another way is to consider scaled reference layer offsets to specify the positions of the corner samples of the upsampled reference region relative to the respective corner samples of the enhancement layer picture. The scaled reference layer offset values may be signed. Reference region offsets may be considered to specify the horizontal and vertical offsets between the top-left luma sample of the reference region in the decoded picture in a reference layer and the top-left luma sample of the same decoded picture as well as the horizontal and vertical offsets between the bottom-right luma sample of the reference region in the decoded picture in a reference layer and the bottom-right luma sample of the same decoded picture. The reference region offset values may be signed. A resampling phase set may be considered to specify the phase offsets used in resampling process of a source picture for inter-layer prediction. Different phase offsets may be provided for luma and chroma components.

DASH SRD can be a supplemental property or an essential property element, comprising parameters object_x, object_y, object_width, and object_height that indicate the location, width, and height of the Adaptation_Set or Sub-Representation containing the element relative to a picture area that can be indicated by total_width and total_height parameters in an SRD element.

In some embodiments, an enhancement layer is inter-layer predicted. Scalable video decoding process (e.g., SHVC) may be required. In some embodiments, an enhancement layer may be independently coded and, as such, conventional decoding process (e.g., HEVC Main profile) may be required.

Each enhancement layer may be conveyed in its own DASH Representation. A DASH MPD property descriptor may be used to indicate the pair of quality levels (or the respective representations) that the enhancement layer representation is meant for.

In some embodiments, the boundary area between Tile_A and Tile_B may be filtered after decoding and before rendering the adjacent tiles. The filtering may further conceal the visible boundary between Tile_A and Tile_B. For example, the filter may be symmetric or asymmetric (such that values from the high quality side of the boundary are 'smeared' onto the lower quality side), or filtering may occur by means of a nonlinear algorithm.

Operation

FIG. 9 is an example flowchart illustrating a method of operating an example apparatus, such as for example, an encoder, the method performed in accordance with an embodiment of the present invention. Specifically FIG. 4 shows an example method for improving the visual quality of viewport-based omnidirectional video streaming, and in particular, concealing the sharp resolution and/or quality boundary between, for example, the primary viewport and a background viewport.

As shown in block 905 of FIG. 9, the apparatus 200 embodied by the computing device 110 may then therefore be configured to select a primary viewport. The apparatus embodied by the computing device may therefore include means, such as the processor 220, the communication interface 260 or the like, for selecting a primary viewport. For example, the primary viewport may be selected on the basis of head orientation information received through the communication interface 260. In another example, the flowchart of FIG. 9 may be carried out for a set of primary viewports, which may for example collectively cover the omnidirectional content completely.

As shown in block 910 of FIG. 9, the apparatus 200 embodied by the computing device 110 may then therefore be configured to encode a first representation that covers the primary viewport. The apparatus embodied by the computing device may therefore include means, such as the processor 220, the communication interface 260 or the like, for encoding a first representation that covers the primary viewport.

As shown in block 915 of FIG. 9, the apparatus 200 embodied by the computing device 110 may then therefore be configured to encode a second representation that provides a gradual picture quality change from a background viewport to the primary viewport. The apparatus embodied by the computing device may therefore include means, such as the processor 220, the communication interface 260 or the like, for encoding a second representation that provides a gradual picture quality change from a background viewport to the primary viewport.

As shown in block 920 of FIG. 9, the apparatus 200 embodied by the computing device 110 may then therefore be configured to select a tile grid in a manner that the first representation and the second representation are non-overlapping and adjacent. The apparatus embodied by the computing device may therefore include means, such as the processor 220, the communication interface 260 or the like, for selecting a tile grid in a manner that the first representation and the second representation are non-overlapping and adjacent.

As shown in block 925 of FIG. 9, the apparatus 200 embodied by the computing device 110 may then therefore be configured to encode the first representation as a first motion-constrained tile set and the second representation as a second motion-constrained tile set. The apparatus embodied by the computing device may therefore include means, such as the processor 220, the communication interface 260 or the like, for encoding the first representation as a first motion-constrained tile set and the second representation as a second motion-constrained tile set.

As shown in block 930 of FIG. 9, the apparatus 200 embodied by the computing device 110 may then therefore be configured to encode a third representation, the third representation being non-overlapping with and adjacent to the second representation and non-adjacent to the first representation, the background viewport covering the third representation. The apparatus embodied by the computing device may therefore include means, such as the processor 220, the communication interface 260 or the like, for encoding a third representation, the third representation being non-overlapping with and adjacent to the second representation and non-adjacent to the first representation, the background viewport covering the third representation.

As shown in block 935 of FIG. 9, the apparatus 200 embodied by the computing device 110 may then therefore be configured to select the tile grid in a manner that the second representation occupies a fraction of coding blocks compared to the first representation and the third representation. The apparatus embodied by the computing device may therefore include means, such as the processor 220, the communication interface 260 or the like, for selecting the tile grid in a manner that the second representation occupies a fraction of coding blocks compared to the first representation and the third representation.

As shown in block 940 of FIG. 9, the apparatus 200 embodied by the computing device 110 may then therefore be configured to encode a fourth representation, the fourth representation being non-overlapping with and adjacent to the first representation, the background viewport covering the fourth representation. The apparatus embodied by the computing device may therefore include means, such as the processor 220, the communication interface 260 or the like, for encoding a fourth representation, the fourth representation being non-overlapping with and adjacent to the first representation, the background viewport covering the fourth representation.

As shown in block 945 of FIG. 9, the apparatus 200 embodied by the computing device 110 may then therefore be configured to encode the second representation as a region-of-interest scalable layer over one or both of the first representation and the fourth representation. The apparatus embodied by the computing device may therefore include means, such as the processor 220, the communication interface 260 or the like, for encoding the second representation as a region-of-interest scalable layer over one or both of the first representation and the fourth representation. In some embodiments, the second representation covers a fraction of coding blocks compared to the first representation and the fourth representation.

FIG. 10 is an example flowchart illustrating a method of operating an example apparatus, such as for example, a decoder, the method performed in accordance with an embodiment of the present invention. Specifically, FIG. 10 shows an example method for decoding VR content for display on a HMD.

As shown in block 1005 of FIG. 10, the apparatus 200 embodied by the computing device 110 may then therefore be configured to obtain a primary viewport. The apparatus embodied by the computing device may therefore include means, such as the processor 220, the communication interface 260 or the like, for obtaining a primary viewport. In some embodiments, the primary viewport may be obtained based on an orientation and a field of view of a head-mounted display used for rendering one or both of the first representation and the second representation. In some embodiments, the first representation and the second representation are non-overlapping and adjacent As shown in block 1010 of FIG. 10, the apparatus 200 embodied by the computing device 110 may then therefore be configured to select, obtain, and/or decode a first representation that covers the primary viewport. The apparatus embodied by the computing device may therefore include means, such as the processor 220, the communication interface 260 or the like, for selecting, obtaining, and decoding a first representation that covers the primary viewport.

As shown in block 1015 of FIG. 10, the apparatus 200 embodied by the computing device 110 may then therefore be configured to select, obtain, and/or decode a second representation that provides a gradual picture quality change from a background viewport to the primary viewport. The apparatus embodied by the computing device may therefore include means, such as the processor 220, the communication interface 260 or the like, for selecting, obtaining, and decoding a second representation that provides a gradual picture quality change from a background viewport to the primary viewport.

In some embodiments, the first representation may be a first motion-constrained tile set and the second representation may be a second motion-constrained tile set As shown in block 1020 of FIG. 10, the apparatus 200 embodied by the computing device 110 may then therefore be configured to select, obtain, and/or decode the first representation as a first motion-constrained tile set and the second representation as a second motion-constrained tile set. The apparatus embodied by the computing device may therefore include means, such as the processor 220, the communication interface 260 or the like, for selecting, obtaining, and decoding the first representation as a first motion-constrained tile set and the second representation as a second motion-constrained tile set.

As shown in block 1025 of FIG. 10, the apparatus 200 embodied by the computing device 110 may then therefore be configured to select, obtain, and/or decode a third representation, the third representation being non-overlapping with and adjacent to the second representation and non-adjacent to the first representation, the background viewport covering the third representation. The apparatus embodied by the computing device may therefore include means, such as the processor 220, the communication interface 260 or the like, for selecting, obtaining, and decoding a third representation, the third representation being non-overlapping with and adjacent to the second representation and non-adjacent to the first representation, the background viewport covering the third representation. In some embodiments, the second representation occupies a fraction of coding blocks compared to the first representation and the third representation.

As shown in block 1025 of FIG. 10, the apparatus 200 embodied by the computing device 110 may then therefore be configured to select, obtain, and/or decode a fourth representation, the fourth representation being non-overlapping with and adjacent to the first representation, the background viewport covering the fourth representation. The apparatus embodied by the computing device may therefore include means, such as the processor 220, the communication interface 260 or the like, for selecting, obtaining, and decoding a fourth representation, the fourth representation being non-overlapping with and adjacent to the first representation, the background viewport covering the fourth representation as shown in block 1030 of FIG. 10.

As shown in block 1035 of FIG. 10, the apparatus 200 embodied by the computing device 110 may then therefore be configured to select, obtain, and/or decode the second representation as a region-of-interest scalable layer over one or both of the first representation and the fourth representation. The apparatus embodied by the computing device may therefore include means, such as the processor 220, the communication interface 260 or the like, for selecting, obtaining, and decoding the second representation as a region-of-interest scalable layer over one or both of the first representation and the fourth representation.

FIGS. 9 and 10 illustrate example flowcharts of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 240 of an apparatus employing an embodiment of the present invention and executed by a processor 220 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 9 and 10, when executed, convert a computer or processing circuitry into a particular machine configured to perform an example embodiment of the present invention. Accordingly, the operations of FIGS. 4, 5, and 6 define an algorithm for configuring a computer or processing to perform an example embodiment. In some cases, a general purpose computer may be provided with an instance of the processor which performs the algorithms of FIGS. 9 and 10 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Some embodiments have been described with reference to the term tile. It needs to be understood that the embodiments may be applied but are not limited to tiles as defined in the HEVC standard, but generally apply to similar concepts of spatially isolated regions. It also needs to be understood that in different embodiments the phrase tile may infer further constraints that are not imposed by the HEVC standard; for example, a tile in embodiments may imply coding as a motion-constrained tile. Furthermore, it needs to be understood that the phrase tile may comprise a set of tiles rather than a single tile. Moreover, the phrase tile may be used to refer to a tile rectangle or a sub-picture as discussed above.

Some embodiments have been described with terminology related to DASH. It should be appreciated that embodiments can be similarly realized with other adaptive streaming arrangements over HTTP, such HTTP Live Streaming. It also needs to be understood that embodiments are not limited to HTTP, but apply to other protocols similarly, such as WebSockets, QUIC, SPDY, and RTP, SIP, RTSP as well as different versions of HTTP, such as HTTP/1.1 and HTTP/2.0, or any other protocol at any layer of the ISO OSI protocol layer stack.

What is claimed is:

1. A method comprising:
   selecting a primary viewport;
   encoding, at a first quality, a first representation of the primary viewport;
   encoding, at a second quality, a second representation of a background viewport, the quality at which the first representation is encoded being higher than the second quality at which the second representation is encoded; and encoding a boundary region for the first representation that is adjacent to the first representation, is spherically covered by the background viewport, and provides for an increasing picture quality gradient between the background viewport and the primary viewport, wherein the boundary region has a width defined by a number of pixels between the first representation of the primary viewport and the second representation of the background viewport, and wherein the increasing picture quality gradient is achieved by decreasing a quantization parameter across said pixels between the first representation of the primary viewport and the background viewport.

2. The method of claim 1, further comprising:
encoding the first representation as a first motion-constrained tile set and the second representation as a second motion-constrained tile set.

3. The method of claim 1, further comprising:
selecting the second representation to occupy a fraction of coding blocks compared to the first representation.

4. An apparatus comprising at least one processor and at least one memory including computer program code, the at least one memory and the computer program code configured to, with the processor, cause the apparatus to at least:
select a primary viewport;
encode, at a first quality, a first representation of the primary viewport;
encode, at a second quality, a second representation of the background viewport, the quality at which the first representation is encoded being higher than the second quality at which the second representation is encoded; and
encode a boundary region for the first representation that is adjacent to the first representation, is spherically covered by the background viewport, and provides for an increasing picture quality gradient between the background viewport and the primary viewport, wherein the boundary region has a width defined by a number of pixels between the first representation of the primary viewport and the second representation of the background viewport, and wherein the increasing picture quality gradient is achieved by decreasing a quantization parameter across pixels between the first representation of the primary viewport and the second representation of the background viewport.

5. The apparatus of claim 4, wherein the at least one memory and the computer program code are further configured to, with the processor, cause the apparatus to:
encode the first representation as a first motion-constrained tile set and the second representation as a second motion-constrained tile set.

6. The apparatus of claim 4, wherein the at least one memory and the computer program code are further configured to, with the processor, cause the apparatus to:
select the second representation to occupy a fraction of coding blocks compared to the first representation.

7. A method comprising:
obtaining a primary viewport;
selecting, obtaining, and decoding, from a first quality encoding, a first representation of the primary viewport;
obtaining a background viewport;
selecting, obtaining, and decoding, from a second quality encoding, a second representation of the background viewport, the quality from which the first representation is decoded being higher than the second quality from which the second representation is decoded; and
selecting, obtaining, and decoding a boundary region for the first representation that is adjacent to the first representation, is spherically covered by the background viewport, and provides for an increasing picture quality gradient between the background viewport and the primary viewport, wherein the boundary region has a width defined by a number of pixels between the first representation of the primary viewport and the second representation of the background viewport, and wherein the increasing picture quality gradient is achieved by decreasing a quantization parameter across said pixels between the first representation of the primary viewport and the second representation of the background viewport.

8. The method of claim 7, further comprising:
obtaining the primary viewport based on an orientation and a field of view of a head-mounted display used for rendering one or both of the first representation and the second representation.

9. The method of claim 7, wherein the first representation is a first motion-constrained tile set and the second representation is a second motion-constrained tile set; and the method further comprises:
decoding the first representation as the first motion-constrained tile set and the second representation as the second motion-constrained tile set.

10. The method of claim 7, wherein the second representation occupies a fraction of coding blocks compared to the first representation.

11. An apparatus comprising at least one processor and at least one memory including computer program code, the at least one memory and the computer program code configured to, with the processor, cause the apparatus to at least:
obtain a primary viewport;
select, obtain, and decode, from a first quality, a first representation of the primary viewport;
obtain a background viewport;
select, obtain, and decode, from a second quality, a second representation of the background viewport, the quality from which the first representation is decoded being higher than the second quality from which the second representation is decoded; and
select, obtain, and decode a boundary region for the first representation that is adjacent to the first representation, is spherically covered by the background viewport, and provides for an increasing picture quality gradient between the background viewport and the primary viewport, wherein the boundary region has a width defined by a number of pixels between the first representation of the primary viewport and the second representation of the background viewport, and wherein the increasing picture quality gradient is achieved by decreasing a quantization parameter across said pixels between the first representation of the primary viewport and the second representation of the background viewport.

12. The apparatus of claim 11, wherein the at least one memory and the computer program code are further configured to, with the processor, cause the apparatus to:
obtain the primary viewport based on an orientation and a field of view of a head-mounted display used for rendering one or both of the first representation and the second representation.

13. The apparatus of claim 11, wherein the first representation is a first motion-constrained tile set and the second representation is a second motion-constrained tile set; and wherein the at least one memory and the computer program code are further configured to, with the processor, cause the apparatus to:

decode the first representation as the first motion-constrained tile set and the second representation as the second motion-constrained tile set.

14. The apparatus of claim 11, wherein the second representation occupies a fraction of coding blocks compared to the first representation.

15. The method of claim 1, further comprising:

selecting the first representation and the second representation to overlap in a spherical domain.

16. The apparatus of claim 4, wherein the at least one memory and the computer program code are further configured to, with the processor, cause the apparatus to:

select the first representation and the second representation to overlap in a spherical domain.

17. The method of claim 7, further comprising:

selecting the first representation and the second representation to overlap in a spherical domain.

18. The apparatus of claim 11, wherein the at least one memory and the computer program code are further configured to, with the processor, cause the apparatus to:

select the first representation and the second representation to overlap in a spherical domain.

19. The method of claim 1, further comprising:

encoding a third representation that covers the boundary region for the first representation that is adjacent to the first representation, is spherically covered by the background viewport, and provided for the increasing picture quality gradient between the background viewport and the primary viewport.

20. The apparatus of claim 4, wherein the at least one memory and the computer program code are further configured to, with the processor, cause the apparatus to:

encode a third representation that covers the boundary region for the first representation that is adjacent to the first representation, is spherically covered by the background viewport, and provided for the increasing picture quality gradient between the background viewport and the primary viewport.

21. The method of claim 7, further comprising:

selecting, obtaining, and decoding a third representation that covers the boundary region for the first representation that is adjacent to the first representation, is spherically covered by the background viewport, and provided for the increasing picture quality gradient between the background viewport and the primary viewport.

22. The apparatus of claim 11, wherein the at least one memory and the computer program code are further configured to, with the processor, cause the apparatus to:

select, obtain, and decode a third representation that covers the boundary region for the first representation that is adjacent to the first representation, is spherically covered by the background viewport, and provided for the increasing picture quality gradient between the background viewport and the primary viewport.

23. The method of claim 1, wherein the boundary region comprises a third tile, and wherein the third tile comprises a plurality of one or more pixels either in a horizontal direction or a vertical direction.

24. The method of claim 1, wherein the boundary region comprises a plurality of pixels from either a plurality of pixels of the primary viewport or a plurality of pixels of the background viewport.

25. The method of claim 1, wherein the boundary region comprises a plurality of pixels from the primary viewport and a plurality of pixels from the background viewport.

26. The method of claim 1, wherein the boundary region comprises a plurality of pixels and the plurality of pixels further comprises picture quality gradient.

27. The method of claim 1, further comprising adjusting the picture quality gradient of said first representation and said second representation within said boundary region until the picture quality gradient of said boundary region creates a gradual picture quality change between an edge of the first representation and an edge of the second representation.

28. The method of claim 1, wherein the pixels of the boundary region comprise gradient values, and wherein the gradient values of the plurality of pixels is decreased by increasing the quantization parameter across said plurality of pixels.

29. The method of claim 1, wherein the boundary region comprises a bit rate objective for either the primary viewport or the background viewport, and a rate control algorithm to decrease the quantization parameter across said boundary region.

30. The method of claim 1, wherein the primary viewport and the background viewport comprise bit rate objectives, and wherein the quantization parameter of the primary viewport and the background viewport is determined by a rate control algorithm used to minimize a difference between the quantization parameter of the primary viewport and the background viewport.

* * * * *